United States Patent
Ackerman et al.

(10) Patent No.: US 10,082,450 B2
(45) Date of Patent: Sep. 25, 2018

(54) SYSTEM, METHOD, AND APPARATUS FOR MONITORING CHARACTERISTICS OF A FIRE, SMOKE, THERMAL OR WATER BARRIER DEVICE

(71) Applicant: Hilti Aktiengesellschaft, Schaan (LI)

(72) Inventors: Lucas Ackerman, McKinney, TX (US); Akhil Kejriwal, Dallas, TX (US)

(73) Assignee: Hilti Aktiengesellschaft, Schaan (LI)

( * ) Notice: Subject to any disclaimer, the term of this patent is extended or adjusted under 35 U.S.C. 154(b) by 5 days.

(21) Appl. No.: 15/399,362

(22) Filed: Jan. 5, 2017

(65) Prior Publication Data
US 2018/0188137 A1 Jul. 5, 2018

(51) Int. Cl.
*F16L 5/10* (2006.01)
*G01M 99/00* (2011.01)

(52) U.S. Cl.
CPC .............................. *G01M 99/008* (2013.01)

(58) Field of Classification Search
CPC ........... G01M 99/08; G01M 99/00; F16L 5/10
USPC ...................................................... 73/865.9
See application file for complete search history.

(56) References Cited

U.S. PATENT DOCUMENTS

| | | | |
|---|---|---|---|
| 4,538,389 A * | 9/1985 | Heinen | F16L 5/04 137/75 |
| 5,347,767 A * | 9/1994 | Roth | A62C 2/065 52/1 |
| 6,426,463 B2 | 7/2002 | Munzenberger et al. | |
| 6,477,813 B2 | 11/2002 | Andresen | |
| 7,082,730 B2 | 8/2006 | Monden et al. | |
| 7,412,898 B1 | 8/2008 | Smith et al. | |
| 7,465,888 B2 | 12/2008 | Fischer et al. | |
| 7,642,461 B2 | 1/2010 | Klein et al. | |
| 7,877,941 B2 | 2/2011 | Fischer et al. | |
| 8,188,382 B2 | 5/2012 | Monden et al. | |
| 8,689,503 B2 | 4/2014 | Fischer et al. | |
| 8,689,504 B2 | 4/2014 | Monden et al. | |

(Continued)

FOREIGN PATENT DOCUMENTS

| | | |
|---|---|---|
| DE | 10 2008 055 053 | 7/2010 |
| EP | 2 374 857 | 10/2011 |

(Continued)

OTHER PUBLICATIONS

U.S. Appl. No. 14/811,168.
(Continued)

*Primary Examiner* — Lisa Caputo
*Assistant Examiner* — Jamel Williams
(74) *Attorney, Agent, or Firm* — Grüneberg and Myers PLLC

(57) ABSTRACT

A system, method, and apparatus for monitoring characteristics of a fire, smoke, thermal and/or water barrier device provided in or on a barrier. The monitored characteristics can be used to identify whether the barrier device is installed correctly or is no longer installed correctly and/or to identify conditions associated with use of the barrier device when installed, including at least one of a temperature associated with the barrier device, presence of water in the barrier device, air flow associated with the barrier device, stress and strains placed on the barrier device, and occupied inner volume (including an amount of change) of the barrier device.

18 Claims, 8 Drawing Sheets

(56) References Cited

U.S. PATENT DOCUMENTS

| | | | |
|---|---|---|---|
| 8,776,462 | B2 | 7/2014 | Foerg et al. |
| 9,074,367 | B2 | 7/2015 | Munzenberger |
| 9,121,527 | B2 | 9/2015 | Munzenberger et al. |
| 9,145,987 | B2 | 9/2015 | Muenzenberger |
| 9,151,042 | B2 | 10/2015 | Simon et al. |
| 9,383,043 | B2 | 7/2016 | Klein et al. |
| 9,605,776 | B2 * | 3/2017 | Stanglmeier .............. F16L 5/10 |
| 2004/0112891 | A1 * | 6/2004 | Ellis ....................... A61F 7/007 |
| | | | 219/528 |
| 2004/0129312 | A1 * | 7/2004 | Cuzzo ...................... E03B 9/02 |
| | | | 137/296 |
| 2009/0140858 | A1 | 6/2009 | Gore et al. |
| 2014/0203090 | A1 | 7/2014 | Edwards et al. |
| 2017/0030490 | A1 * | 2/2017 | Vandertook ............ F16J 15/065 |

FOREIGN PATENT DOCUMENTS

| | | | |
|---|---|---|---|
| WO | WO 2007141853 A1 * | 12/2007 | ................ F16L 5/10 |
| WO | 2012/095550 | 7/2012 | |
| WO | WO 2016/061422 | 4/2016 | |
| WO | WO 2016/140613 | 9/2016 | |

OTHER PUBLICATIONS

International Search Report mailed in PCT/EP2017/082175 dated Feb. 15, 2018.
Written Opinion of the International Searching Authority mailed in PCT/EP2017/082175 dated Feb. 15, 2018.

\* cited by examiner

SYSTEM, METHOD, AND APPARATUS FOR MONITORING CHARACTERISTICS OF A FIRE, SMOKE, THERMAL OR WATER BARRIER DEVICE

FIELD

The present disclosure relates to monitoring characteristics of a firestop, smoke, thermal and/or water barrier device provided relative to a corresponding barrier.

SUMMARY

In one aspect of the present disclosure, a barrier device configured to be provided relative to a barrier is provided. The barrier device is configured to output, to a measurement device or system, data corresponding to characteristics of the barrier device to identify whether the barrier device is installed correctly or is no longer installed correctly and/or data corresponding to characteristics of the barrier device associated with use of the barrier device when installed. The barrier device can comprise: a body configured to be provided on or at least partially in the barrier; and at least one characteristic measurement component provided in, on, or adjacent to the body configured to output to the measurement device or system the data corresponding to characteristics of the barrier device to identify whether the barrier device is installed correctly or is no longer installed correctly and/or the data corresponding to characteristics of the barrier device associated with use of the barrier device when installed.

In another aspect of the present disclosure a system for receiving data corresponding to characteristics of a barrier device associated with use of the barrier device and/or installation of the barrier device is provided. The system can comprise: the barrier device, the barrier device being configured to be provided relative to a barrier and to output the data corresponding to characteristics of the barrier device. The barrier device can include: at least one characteristic measurement component provided in or on the barrier device configured transmit the data corresponding to characteristics of the barrier device; and a processor, remote from the barrier device, configured to receive the data corresponding to characteristics of the barrier device from the barrier device via a wired or wireless communication medium.

In yet another aspect of the present disclosure, a protection sleeve configured be installed relative to a barrier is provided. The protection sleeve can comprise: a housing that defines an inner volume between a first end of the housing and a second end of the housing separated from the first end in a longitudinal direction of the housing; a first flange configured to be movable from the first end of the housing toward the second end of the housing; a second flange configured to be provided between the barrier and the second end of the housing; and circuitry configured to sense characteristics of the protection sleeve associated with installation of the protection sleeve or a component relative to the protection sleeve and output data corresponding to the sensed characteristics of the protection sleeve to an monitoring device arranged external to the protection sleeve.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
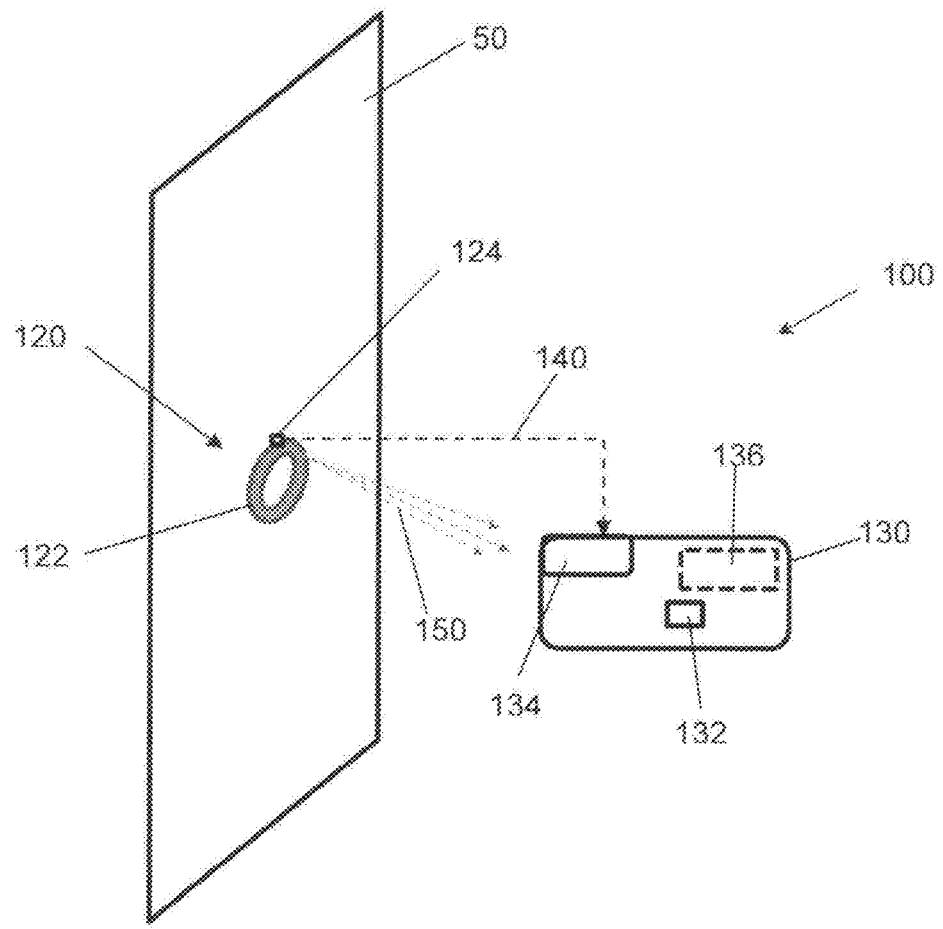
FIG. 1 illustrates a block diagram of a system for monitoring characteristics of a firestop, smoke, thermal and/or water barrier device provided relative to a barrier, in accordance with one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter may and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the disclosed subject matter relate to monitoring characteristics of a barrier device provided relative to a corresponding barrier. According to embodiments of the disclosed subject matter, barriers can include a fire barrier, a smoke barrier, a thermal barrier, a water barrier, an airflow barrier, or a multi-functional barrier of two or more functions of the foregoing barriers (which can include "stop" barriers and "resistant" barriers, for instance). Discussed in more detail below, the barrier device may be provided in, partially or fully, and/or on the barrier. In some cases, one barrier device may be provided in or on another barrier device provided in and/or on the barrier. Further, barrier devices according to embodiments of the disclosed subject matter can be configured to provide feedback regarding characteristics of the barrier device pertaining to installation of the barrier device relative to the barrier and/or characteristics of the barrier device pertaining to use or operating conditions of the barrier device when installed relative to the barrier.

Generally, the characteristics of the barrier device can pertain to or include (but are not limited to) one or more of a temperature associated with the barrier device; presence of water in or on the barrier device; air flow within an inner volume of the barrier device; stress, pressure and/or strain placed on the barrier device or provided by the barrier device; a compressive force applied to or by the barrier device; a length of a body (or portion thereof) of the barrier device; an occupied inner volume, including an amount of change of the occupied inner volume, of the barrier device; a portion of the body (or portion thereof) of the barrier device remaining after installation; a type (e.g., metal or plastic) and/or number of conduits (e.g., cables or wiring) provided in the inner volume of the barrier device; and a type of material of a portion of the barrier device. Further, data corresponding to the feedback regarding the characteristics of the barrier device can be output or transmitted wirelessly and/or via a wired communication medium from the barrier device to a system external to the barrier device.

Turning to the figures, FIG. 1 illustrates a block diagram of a system 100 for monitoring characteristics of a barrier device 120 provided relative to a barrier 50, in accordance with one or more embodiments of the present disclosure. As noted above, the barrier 50 can be a firestop barrier, a smoke barrier, a thermal barrier, a water barrier, an airflow barrier, or a multi-functional barrier of two or more functions of the foregoing barriers. Further, the barrier 50 may take the form of a wall, a floor, or a ceiling, for instance. The barrier 50 of FIG. 1 may be generally representative of a wall.

The system 100 can be comprised of the barrier device 120 and an electronic monitoring or measurement device 130. Discussed in more detail below, the measurement device 130 may be external to the barrier device 120, but the two devices may communicate with each other, periodically or continuously, depending upon communication protocols, communication circuitry (including a communication medium or mediums) and/or proximity, for instance. In one or more embodiments, the measurement device 130 may be interpreted as an interrogator, sending signals to the barrier device 120 to provoke the barrier device 120 to send back signals corresponding to characteristics of the barrier device 120 pertaining to installation and/or use of the barrier device 120. Also, in one or more embodiments, the measurement device 130 may be a subcomponent of a multi-function device, such as a portable electronic communication device, including a smart device (e.g., a cell phone, PDA, tablet, etc.). Alternatively, the measurement device 130 may be a standalone device.

The measurement device 130 can have a processor 132, a communication interface 134, and an optional user interface 136. In one or more embodiments, the measurement device 130 may be a portable measurement device, for instance, a hand held measurement device, such as a mobile smart device or a radio frequency identification (RFID) interrogator. Additionally or alternatively, the measurement device 130 may be a so-called "back office" measurement device that can monitor one or more barrier devices 120.

The communication interface 134 can receive signals from the barrier device 120 corresponding to feedback regarding characteristics of the barrier device 120 wirelessly, using a wireless communication medium and protocol 150, and/or using a wired communication medium and protocol 140. Wireless communication mediums and protocols according to embodiments of the disclosed subject matter can involve radio frequency (RF) transmissions through the air (e.g., as with RFID implementations), near field communication (NFC), and acoustic wave excitation or emission, for instance. Wired communication protocols can include packet-based communications, optical fiber communications, and power line communication (PLC) communications, for instance. Thus, the communication interface 134 of the measurement device 130 may have circuitry, circuits, modules, etc. configured to communicate with the barrier device 120 using corresponding wireless and/or wired communication mediums and protocols. Optionally, the communication interface 134 can output a signal or signals (not expressly illustrated) to the barrier device 120 to receive data from the barrier device 120. For example, the communication interface 134 may output an RFID interrogation signal or signals to one or more RFID circuits of the barrier device 120 to receive the feedback regarding characteristics of the barrier device 120.

The processor 132 can be communicably connected to the communication interface 134, and can receive data from the communication interface 134 corresponding to the feedback regarding the characteristics of the barrier device 120. The processor 132, which may be implemented in circuitry, software or a combination of the two, can perform analysis on the data to determine information pertaining to installation of the barrier device 120 relative to the barrier 50 and/or to determine whether characteristics of the barrier device 120 pertaining to use or operating conditions of the barrier device 120 when installed are within acceptable predefined limits.

For example, the processor 132 can analyze the received data to determine whether the barrier device 120 has been installed correctly (or incorrectly) and/or is no longer installed correctly based on a comparison of the received data to predetermined or known data regarding correct (or incorrect) installation. As non-limiting examples, the predetermined or known data regarding correct (or incorrect) installation of the barrier device 120 can include stress, strain, pressure, or force thresholds for select parts of the barrier device 120; inductive, resistive, or capacitive loss characteristics or signatures to determine a material from which a component of the barrier device 120 is made (i.e., to ensure that a component composed of a correct material is installed), and characteristics or signatures pertaining to a size (e.g., length) of the barrier device 120 installed relative to the barrier 50.

As another example, the processor 132 can analyze the received data to determine whether characteristics of the barrier device 120 pertaining to use or operating conditions of the barrier device 120, when installed, are within acceptable predefined limits or thresholds. Examples of predefined limits or thresholds for acceptable use of the barrier device 120 can include, but are not limited to, limits or thresholds involving a temperature associated with the barrier device 120; presence of water in the barrier device 120; air flow associated with the barrier device 120; stress, pressure and/or strain placed on the barrier device 120 or provided by the barrier device 120; a compressive force applied to or by the barrier device 120; an occupied inner volume, including an amount of change of the occupied inner volume, of the barrier device 120; and a type and/or number of cables, wiring, or pipe-penetrants provided in an inner volume of the barrier device 120. Optionally, in one or more embodiments, the barrier device 120 may have a processor or processing circuitry to determine whether sensed or measured data at the barrier device 120 is outside of predefined limits or thresholds for acceptable use, and may transmit corresponding data to the measurement device 130 only when such limit(s) or threshold(s) for acceptable use are not met.

The predetermined or known data and/or the predefined limits or thresholds can be retrieved from memory (not expressly illustrated) of the measurement device 130. Further, the predetermined or known data and/or the predefined limits or thresholds can be input using the user interface 136. The user interface 136 may include a display configured to output information, based on the analysis, pertaining to installation of the barrier device 120 relative to the barrier 50 and/or to determine whether characteristics of the barrier device 120 pertaining to use or operating conditions of the barrier device 120 when installed are within acceptable predefined limits. For example, the display of the user interface 136 may display an indication of whether or not the barrier device 120 is installed correctly, and, if not, an identified issue with the installation. Likewise, the display of the user interface 136 can display one or more indications corresponding to use or operating conditions identified as being outside of predefined limits or thresholds. Also, in the case where multiple barrier devices 120 are implemented, the display of the user interface 136 can display information corresponding to sensed or measured conditions of one, some, or all of the barrier devices 120.

The barrier device 120 can be configured to be installed relative to the barrier 50. For example, depending upon the configuration and/or use for the barrier device 120, the barrier device 120 may be provided in the barrier 50, partially or fully, and/or on the barrier 50. Further, the barrier device 120 may be removably or fixedly provided relative to the barrier 50. Also, though FIG. 1 illustrates one barrier device 120, multiple barrier devices may be provided relative to the barrier 50. Such barrier devices 120 may be of the same configuration or different configurations. Further, each barrier device 120 may communicate with the measurement device 130. Barrier devices 120 according to embodiments of the disclosed subject matter may be in the form of and/or operate according to the respective barrier devices in U.S. Pat. No. 6,426,463; U.S. Pat. No. 7,465,888; U.S. Pat. No. 9,151,042; U.S. Pat. No. 6,477,813; U.S. Pat. No. 9,145,987; U.S. Pat. No. 9,121,527; U.S. Pat. No. 7,877,941; U.S. Pat. No. 8,776,462; U.S. Pat. No. 9,383,043; U.S. Pat. No. 8,689,504; U.S. Pat. No. 9,074,367; U.S. Pat. No. 8,689,503; U.S. Pat. No. 8,188,382; U.S. Pat. No. 7,642,461 or U.S. Pat. No. 7,082,730, the entire content and disclosure of each of which is incorporated herein by reference. Of course, barrier devices 120 are not limited to the barrier devices described in the foregoing patents.

The barrier device 120 can have a body 122, which may define an inner volume, and at least one characteristic measurement component 124. The characteristic measurement component 124 can be provided in, on, adjacent to, or as the body 122. Further, though FIG. 1 illustrates only one characteristic measurement component 124, the barrier device 120 can have more than one characteristic measurement component 124. Further, such multiple characteristic measure components 124 can be the same type components, the same type components but at different locations, or different components.

The characteristic measurement component 124 can output, for instance, to the measurement device 130, signals or data corresponding to characteristics of the barrier device 120, which may identify or may be analyzed to identify whether the barrier device 120 is installed correctly or is no longer installed correctly. Additionally or alternatively, the signals or data output by the characteristic measurement component 124 may correspond to characteristics of the barrier device 120 associated with use of the barrier device 120 when installed. In one or more embodiments, the characteristic measurement component 124 can measure or sense one or more of such characteristics of the barrier device 120, and such data can be output by the characteristic measurement component 124 or a corresponding transmission component thereof. Thus, in one or more embodiments of the disclosed subject matter, the characteristic measurement component 124 can be a sensor or a detector. Additionally or alternatively, the characteristic measurement component 124 can output data in response to an electrical, a mechanical or an acoustical perturbation, such as application of a mechanical excitation (e.g., periodic) over a prescribed bandwidth. For example, in one or more embodiments, the characteristic measurement component 124 can output measured data to an RFID circuit that transmits signals correspond to the data to measurement device 130, for instance, which may be or include an RFID interrogator. Alternatively, the RFID circuit may also be configured as a sensor.

Optionally, the characteristic measurement component 124 may be a so-called smart component, such as a smart sensor, and can perform some degree of analysis on the measured characteristics of the barrier device 120 using a processor, for instance. For example, the characteristic measurement component 124 in the form of a smart component can analyze the measured characteristics of the barrier device 120 and output data to the measurement device 130, for instance, when sensed or measured data at the barrier device 120 is outside of predefined limits or thresholds for acceptable use. In such a case, the measurement device 130 may not need to further analyze the data from the barrier device 120 to determine correct installation of the barrier device 120, for instance.

Thus, the characteristic measurement component 124 according to embodiments of the disclosed subject matter can take a variety of forms (including component, circuit, etc. configuration), and can implement a variety of different mechanisms to sense or measure characteristics of the barrier device 120 or otherwise output data corresponding to characteristics of the barrier device 120. FIGS. 2A-2J are diagrammatic illustrations of a barrier device 120 provided with non-limiting examples of different characteristic measurement components 124 to implement corresponding different measuring methodologies for monitoring characteristics of the barrier device 120, according to one or more embodiments of the present disclosure. As noted above, the barrier device 120 can be connected to or part of transmission circuitry to output signals or data corresponding to the measured characteristics of the barrier device 120.

Figure 2A:
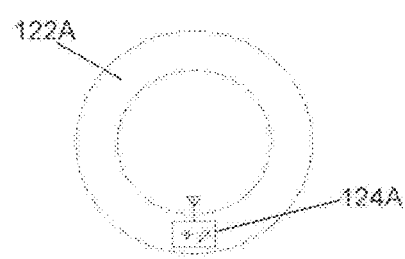
FIGS. 2A-2J are diagrammatic illustrations of a barrier device provided with different measuring or sensing components to implement corresponding different measuring methodologies for monitoring characteristics of the barrier device, according to one or more embodiments of the present disclosure.
Figure 2B:
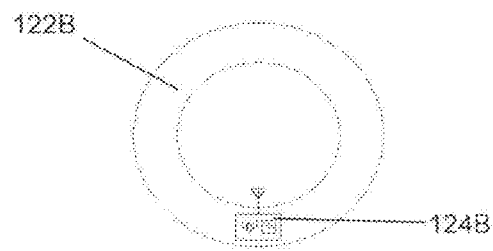
Figure 2C:
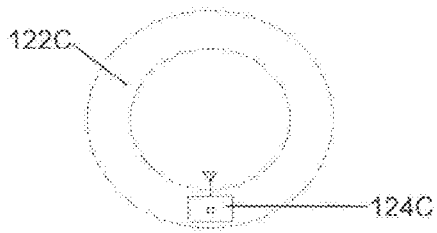
Figure 2D:
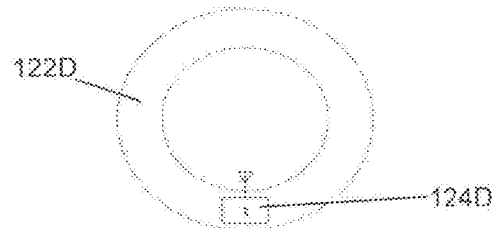
Figure 2E:
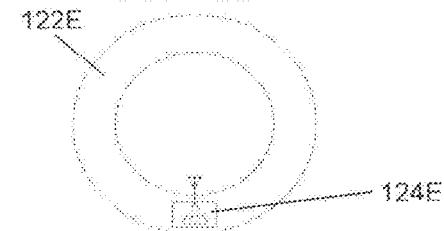
Figure 2F:
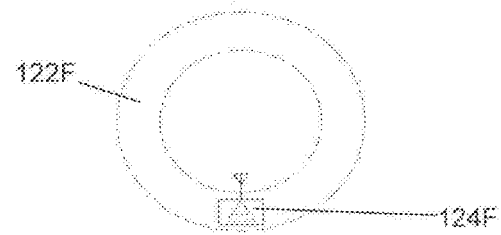
Figure 2G:
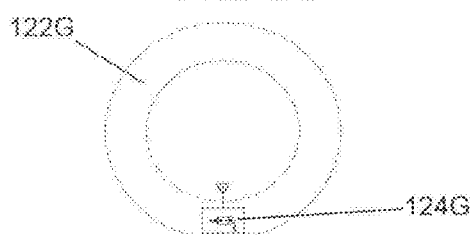
Figure 2H:
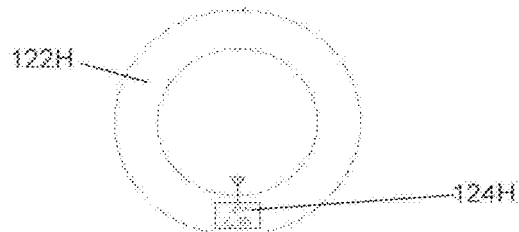
Figure 2I:
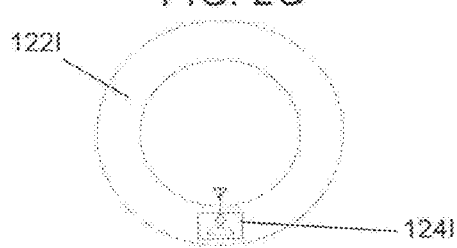
Figure 2J:
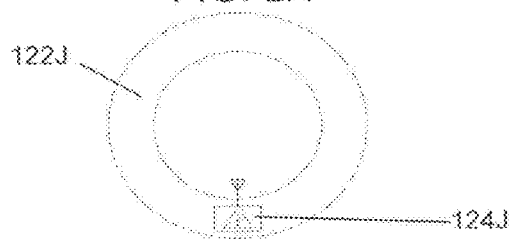

In particular, FIG. 2A illustrates a body 122A of the barrier device provided with, relative to, or as a characteristic measurement component 124A in the form of a capacitive sensor (e.g., capacitive reactance/susceptance, variable capacitance); FIG. 2B illustrates a body 122B of the barrier device provided with, relative to, or as a characteristic measurement component 124B in the form of a mechanical resonance implementation (e.g., a mechanical excitation to the characteristic measurement component 124B over a prescribed bandwidth can produce a response of variable magnitude within the body 122B or a surrounding portion, such as a flange); FIG. 2C illustrates a body 122C of the barrier device provided with, relative to, or as a characteristic measurement component 124C in the form of a stress sensor (e.g., to measure stress); FIG. 2D illustrates a body 122D of the barrier device provided with, relative to, or as a characteristic measurement component 124D in the form of a strain sensor; FIG. 2E illustrates a body 122E of the barrier device provided with, relative to, or as a characteristic measurement component 124E in the form of a resistive sensor (e.g., resistance or conductance variability can effect measurable changes in amplitude responses of an applied excitation waveform via a passive RLC network(s) of the characteristic measurement component 124E); FIG. 2F illustrates a body 122F of the barrier device provided with, relative to, or as a characteristic measurement component 124F in the form of an inductive sensor (e.g., when excited by a radio frequency RF signal, as an external influence is applied relative to the barrier device, such as installing or removing cables, eddy currents can be created which affect the RF output by the characteristic measurement component 124F); FIG. 2G illustrates a body 122G of the barrier device provided with, relative to, or as a characteristic measurement component 124G in the form of a piezoelectric sensor; FIG. 2H illustrates a body 122H of the barrier device provided with, relative to, or as a characteristic measurement component 124H in the form of a magnetic sensor; FIG. 2I illustrates a body 122I of the barrier device provided with, relative to, or as a characteristic measurement component 124I in the form of an electrical resonance implementation; and FIG. 2J illustrates a body 122J of the barrier device provided with, relative to, or as a characteristic measurement component 124J in the form of a continuity sensor (e.g., binary resistance/conductance measurement). Of course, though FIGS. 2A-2J show only one characteristic measurement component 124 per figure, in embodiments of the disclosed subject matter two or more characteristic measurement components 124 of the same type may be implemented and/or two or more characteristic measurement components 124 of different type may be implemented.

Turning now to FIGS. 3-11, these figures illustrate non-limiting examples of barrier devices according to embodiments of the disclosed subject matter.

Figure 3:
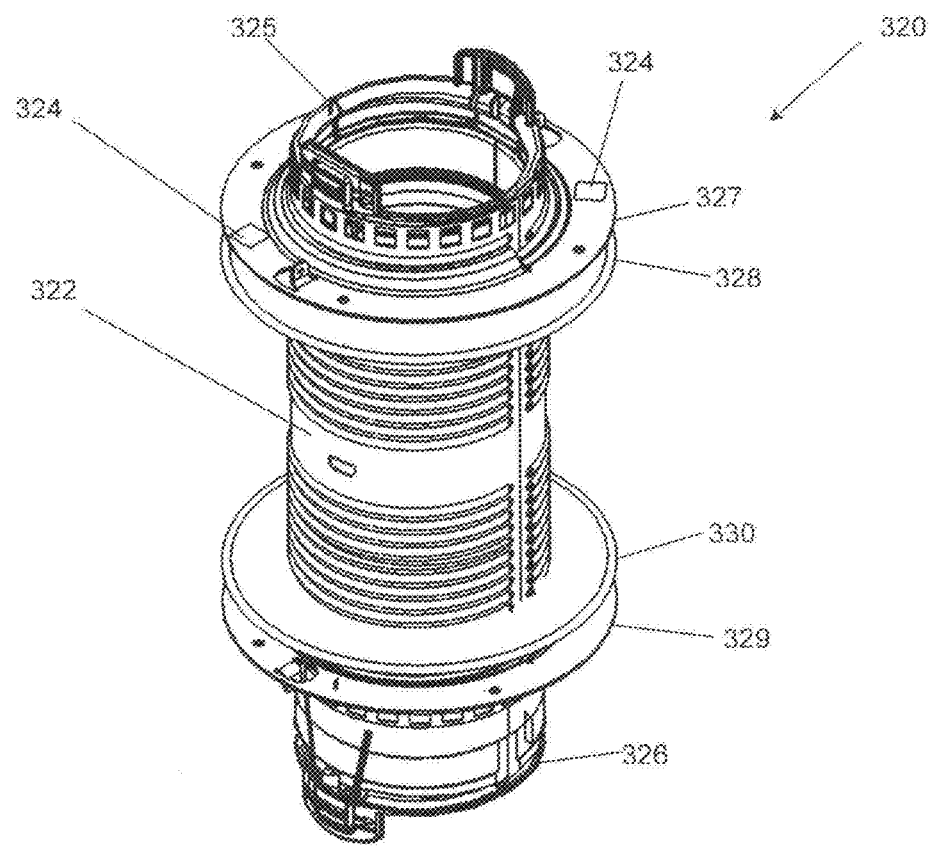
FIG. 3 is a perspective view of a barrier device in the form of a protection sleeve, according to one or more embodiments of the disclosed subject matter.
Figure 4:
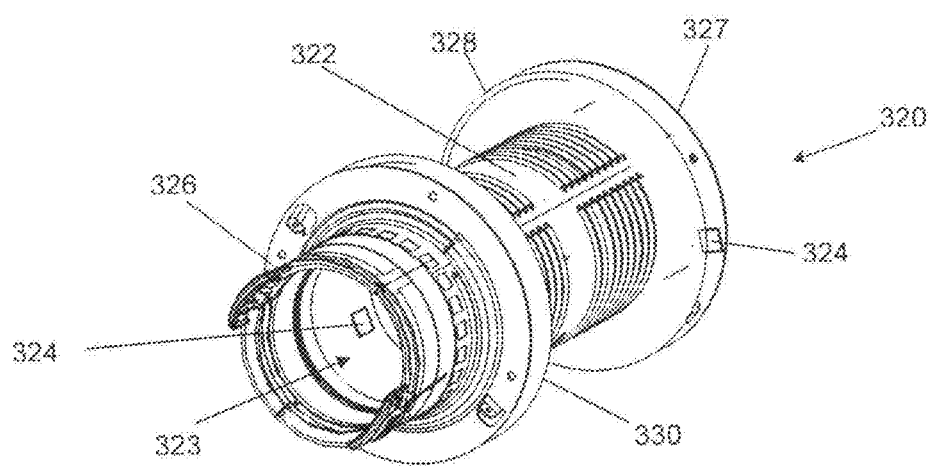
FIG. 4 is another perspective view of the barrier device of FIG. 3.
Figure 5:
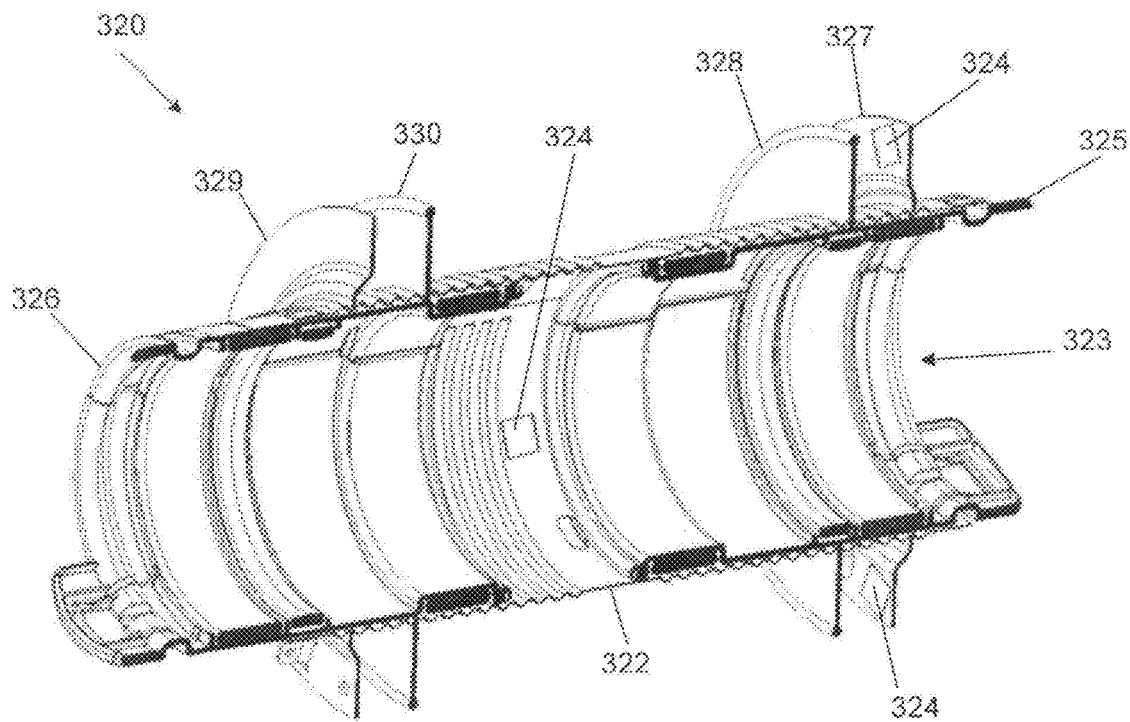
FIG. 5 is a cross-sectional perspective view of the barrier device of FIG. 3.

In particular, FIGS. 3-5 illustrate various views of a barrier device in the form of a protection sleeve 320, according to one or more embodiments of the disclosed subject matter. The protection sleeve 320 may be a fire-protection sleeve configured to provide at least fire protection to components provided therein and between adjacent spaces separated by a corresponding barrier (not expressly illustrated). The protection sleeve 320 may also provide protection against smoke, heat, excess air flow, and/or water.

The protection sleeve 320 can be comprised of a body in the form of a housing 322 that defines an inner volume 323 between a first end 325 of the housing 322 and a second end 326 of the housing 322 separated from the first end 325 in a longitudinal direction of the housing 322. The protection sleeve 320 can be provided relative to a barrier, such as a wall, such that a portion of the housing 322 is inside an opening of the barrier and such that the first end 325 and the second end 326 extend from the barrier. Cables or wiring, for instance, may be provided in the inner volume 323 and extend from the first end 325 to the second 326 and beyond in each direction for instance.

The protection sleeve 320 can also be comprised of at least one flange 327. FIGS. 3-5, however, illustrate that the protection sleeve 320 can also include another flange, flange 330. Generally speaking, each flange 327, 330 can be configured to move from the first end 325 and the second end 326, respectively, toward each other. Alternatively, the flange 330 can be fixed to the housing 322 and not movable relative to the longitudinal axis of the housing 322. In the embodiment of FIGS. 3-5, each flange 327, 330 can be rotated along threads of the housing 322 toward a relative middle portion of the housing 322. Of course, when provided relative to the barrier, the flange 327 and the flange 330 can be moved toward each other so as to contact respective sides of the barrier, either directly or indirectly. One or both of the flanges 327, 330 may be caused to continue to move toward the barrier to provide an appropriate amount of force or pressure to securely hold the protection sleeve 320 in place relative to the barrier. Optionally, the protection sleeve 320 can have a flange gasket 328 provided on a side of the flange 327 away from the first end 325. Likewise, optionally, the protection sleeve 320 can have a flange gasket 330 provided on a side of the flange 329 away from the second end 326. As such, flange gasket 328 and flange gasket 330 can be between the flange 327 and one side of the barrier and the flange 329 and the other side of the barrier, respectively. Optionally, the protection sleeve 320 can be as set forth in U.S. patent application Ser. No. 14/811,168, the entire content and disclosure of each of which is incorporated herein by reference.

The protection sleeve 320 can also be comprised of one or more characteristic measurement components 324. For example, one or more characteristic measurement components 324 can be provided in, on, relative to, or as the flange 327. FIGS. 3-5 show that the flange 327 can have two characteristic measurement components 324 provided therein or thereon. Optionally, one or more characteristic measurement components 324 can be provided in, on, adjacent to, or as the flange 329 (not expressly illustrated). Alternatively, only one of the flanges, flange 327, for instance, may have or be the one or more characteristic measurement components 324. Additionally or alternatively, one or more characteristic measurement components 324 may be provided in, on, as, or relative to the flange gasket 328. Optionally, one or more characteristic measurement components 324 can be provided in, on, adjacent to, or as the flange gasket 330 (not expressly illustrated). Alternatively, only one of the flange gaskets, flange gasket 328, for instance, may have or be the one or more characteristic measurement components 324. According to one or more embodiments of the disclosed subject matter, one or more characteristic measurement components 324 may be provided in or on the housing 322. FIGS. 3-5 show that the housing 322 can have one characteristic measurement components 324 provided therein or thereon.

As a non-limiting example, each characteristic measurement component 324 in the flange 327, for instance, can be a stress or pressure sensor to sense or detect stress or torsion applied to the flange 327. In such as case, the characteristic measurement component 324 in the form of the stress or pressure sensor may be connected to a radio frequency identification device (RFID) of the flange 327, for instance, or the RFID device of the flange 327 may have a built in stress or pressure sensor. Thus, stress or pressure can be measured and output from the characteristic measurement component 324 (or an associated RFID device) to the measurement device 130, for instance. The data output can be indicative of whether the flange 327 has been tightened to an acceptable installation tightening amount against the barrier.

As another non-limiting example, a mechanical resonance frequency (natural frequency of oscillation) measurement of the flange 324 can be used to determine whether the flange 327 has been tightened sufficiently against the barrier. Thus, the flange 327 itself may be considered the characteristic measurement component 324. In this regard, application of a periodic mechanical excitation over a prescribed bandwidth to the flange 327 can produce a response of variable magnitude within the flange 327, which can be detected by the measurement device 130, for instance, to determine whether the flange 327 is tightened against the barrier to an acceptable installation tightening amount.

As another non-limiting example, each characteristic measurement component 324 can be in the form of piezoelectric filaments provided in or adjacent to the flange gasket 328, for instance. Signals from such piezoelectric filaments can indicate distortion of the flange gasket 328 as the flange 327 presses against the flange gasket 328, which can be output to the measurement device 130, for instance, to determine whether the flange 327 is tightened against the barrier to an acceptable installation tightening amount.

In another non-limiting example, the characteristic measurement component 324 can include two conductive elements provided on opposite sides of the flange gasket 328 to measure a capacitive value, essentially using compression/decompression of the flange gasket 328 as a variable thickness dielectric. Modes of measurement can utilize effects of variable capacitive reactance, variable capacitive susceptance, or variable charge density/flux based on a fixed-potential supply. Capacitance measurements from such characteristic measurement component 324 can indicate distortion of the flange gasket 328 as the flange 327 presses against the flange gasket 328, which can be output to the measurement device 130, for instance, to determine whether the flange 327 is tightened against the barrier to an acceptable installation tightening amount.

In the case of a characteristic measurement component 324 provided on or in the housing 324, such as illustrated in FIGS. 4 and 5, as a non-limiting example, each characteristic measurement component 324 can be a stress or pressure sensor to sense or detect stress or torsion applied to the housing 324, for instance, to the inner surface of the housing 324, due to components, such as cables, being passed through the inner volume of the housing 324. In such as case, the characteristic measurement component 324 in the form of the stress or pressure sensor may be connected to a radio frequency identification device (RFID) of the housing 324, for instance, or an RFID device of the housing 324 may have a built in stress or pressure sensor. Thus, stress or pressure can be measured and output from the characteristic measurement component 324 (or an associated RFID device) to the measurement device 130, for instance. The data output can be indicative of whether the housing 324 has been subjected to stresses above a predetermined amount, such as stresses likely to cause damage or compromise the integrity of the housing 324.

As another non-limiting example of a characteristic measurement component 324 provided on or in the housing 324, a capacitive/inductive measurement system can include, for instance, metallic wires (not expressly shown) provide in the material of the housing 324, which may be incorporated into an RFID circuit. When excited by an RFID signal a current can flow through the wires. As cables are added in the inner volume 323 of the housing 324, eddy currents can be created, which can affect the RFID output. Such data can be output to the measurement device 130, for instance, to determine a type, number and/or volume of cables inside the inner volume 323 of the housing 324.

Figure 6:
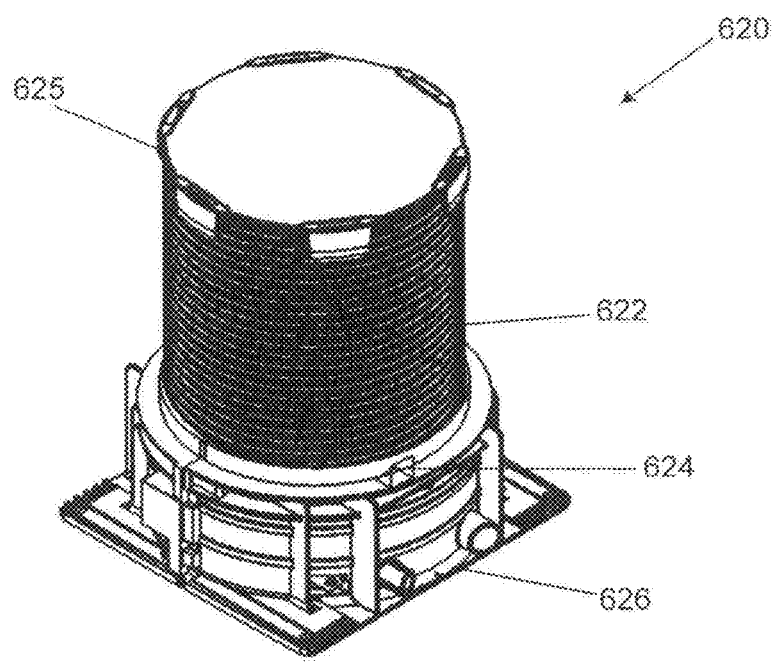
FIG. 6 is a perspective view of a barrier device in the form of a cast-in sleeve, according to one or more embodiments of the disclosed subject matter.
Figure 7:
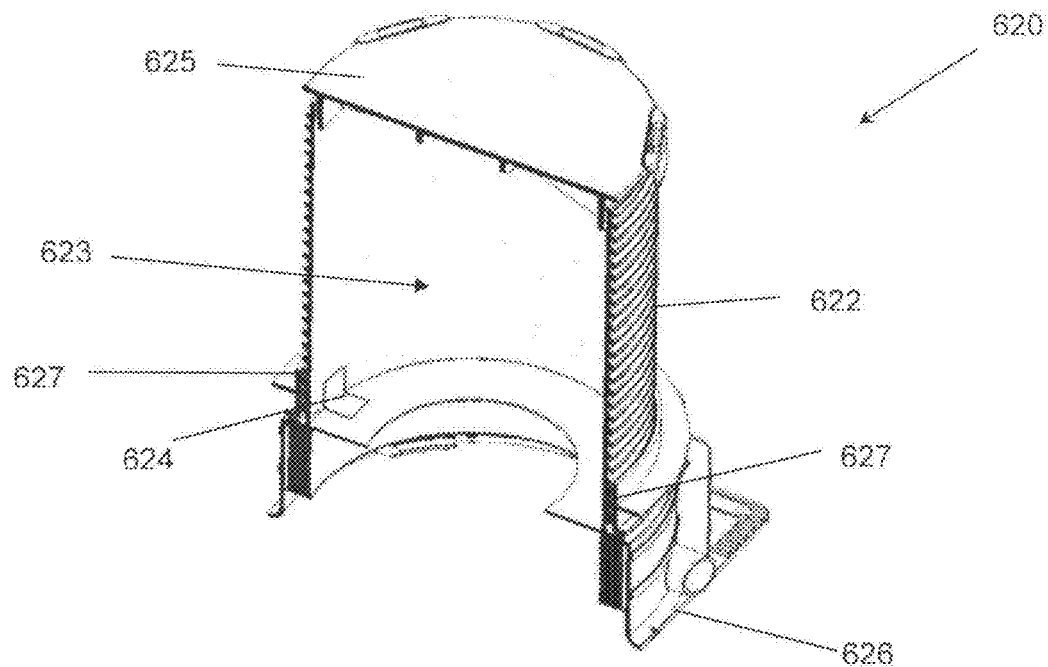
FIG. 7 is a cross-section perspective view of the barrier device of FIG. 6.

Turning now to FIGS. 6 and 7, these figures illustrate various views of a barrier device in the form of a cast-in sleeve or device 620, according to one or more embodiments of the disclosed subject matter. The cast-in device 620 may be a fire-protection device configured to provide at least fire protection to components therein and between adjacent spaces separated by a corresponding barrier, such as a floor or ceiling (not expressly illustrated). The cast-in device 620 may also provide protection against smoke, excessive air flow, heat and/or water.

The cast-in device 620 can be comprised of a jacket tube 622 (which may be referred to herein as a housing) that defines an inner volume 623 between a first end of the jacket tube 622 and a second end of the jacket tube 622 separated from the first end in a longitudinal direction of the jacket tube 622. As can be seen from FIGS. 6 and 7, the jacket tube 622 can include a threaded profile formed as a continuous thread extending over the entire longitudinal extent of the jacket tube 622, for instance. The cast-in device 620 can also be comprised of a base member 626 having a receiving interface 627 configured to receive the jacket tube 622, for instance, to threadingly receive the jacket tube 622, as illustrated in FIGS. 6 and 7. Optionally, the cast-in device 620 can include a cover 625 removably connected to the first end of the jacket tube 622.

The cast-in device 620 can also be comprised of one or more characteristic measurement components 624. Generally speaking, the characteristic measurement components 624 for the cast-in device 620 may operate based on some or all of the principles of the characteristic measurement components of the protection sleeve 320 discussed above. For example, one or more characteristic measurement components 624 can be provided in, on, relative to, or as the jacket tube 622 and/or a portion of the base member 626, such as illustrated in FIG. 7.

In one or more embodiments of the disclosed subject matter, such characteristic measurement component 624 can be a stress sensor provided adjacent to an elastomeric gasket of the cast-in device 620 to measure compression fit of the jacket tube 622 relative to the receiving interface 627 of the base member 626. Such data can be output to the measurement device 130, for instance, to determine whether a tightness of the jacket tube 622 in the receiving interface 627 meets a predefined threshold (e.g., for water tightness, air tightness, etc.).

As another example, the characteristic measurement component 624 can be a sensor to sense moisture or wetness inside the inner volume 623 of the cast-in device 620, for instance. More specifically, in the event that moisture presents inside the cast-in device 620, the moisture may attach to the sensor, which can cause a change in a capacitive value of the sensor. Such change in capacitive value can be output as data to the measurement device 130, for instance, to indicate that moisture exists in the cast-in device 620.

In the case of the characteristic measurement component 624 provided on or in the jacket tube 622, in a non-limiting example, each characteristic measurement component 624 can be a stress or pressure sensor to sense or detect stress or torsion applied to the jacket tube 622, for instance, to the inner surface of the jacket tube 622, due to components, such as cables, being passed through the inner volume 623 of the jacket tube 622. In such as case, the characteristic measurement component 624 in the form of the stress or pressure sensor may be connected to a radio frequency identification device (RFID) of the jacket tube 622, for instance, or the RFID device of the jacket tube 622 may have a built in stress or pressure sensor. Thus, stress or pressure can be measured and output from the characteristic measurement component 624 (or an associated RFID device) to the measurement device 130, for instance. The data output can be indicative of whether the jacket tube 622 has been subjected to stresses above a predetermined amount, such as stresses likely to cause damage or compromise the integrity of the jacket tube 622.

As yet another example, one or more characteristic measurement components 624 can be provided in or on the receiving interface 627 and can take the form of a resistive or capacitive sensor. Outputs of such sensor or sensors can have characteristics or a signature corresponding to a particular type of material used for the jacket tube 622. Thus, correct installation regarding a jacket tube 622 can involve determining that the installed jacket tube 622 is made of a "correct" or "approved" material.

Figure 8:
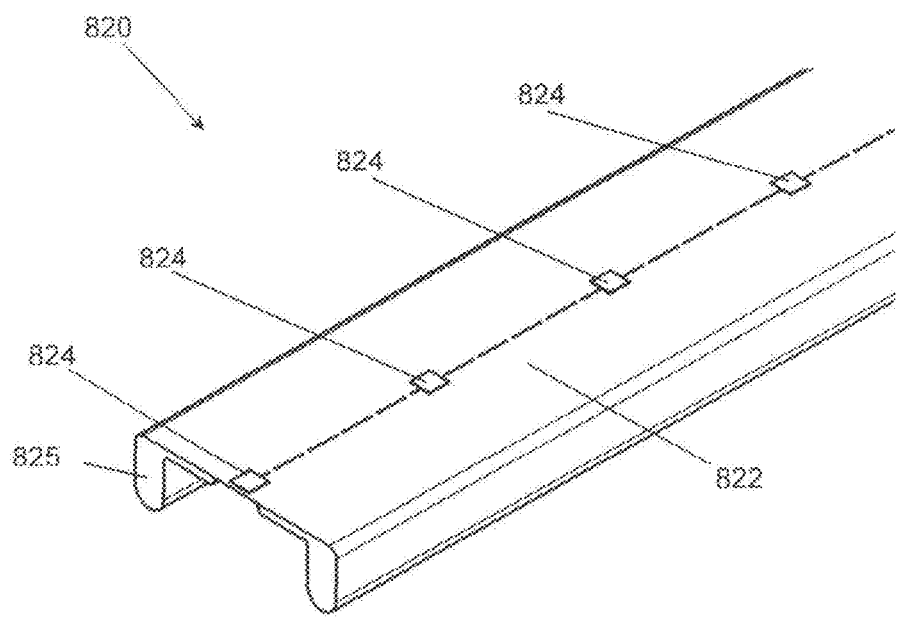
FIG. 8 is a perspective view of a barrier device in the form of a track or strip, according to one or more embodiments of the disclosed subject matter.
Figure 9:
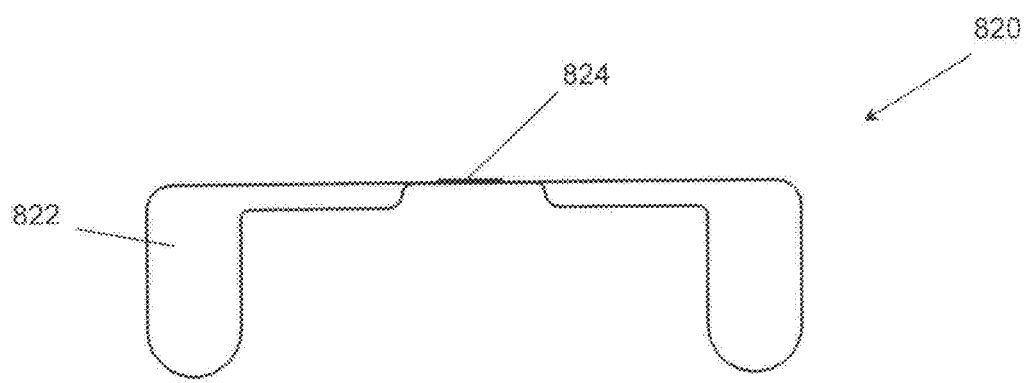
FIG. 9 is an end or cross-sectional view of the barrier device of FIG. 8.

Turning now to FIGS. 8 and 9, these figures illustrate various views of a barrier device in the form of a track or strip 820, for instance, an intumescent track or strip device, according to one or more embodiments of the disclosed subject matter. The strip 820 may have a plurality of characteristic measurement components 824 provided in or on a body 822 of the strip 820, beginning from a first end 825 of the strip 820 and extending toward and optionally to a second end (not illustrated) of the strip 820. The characteristic measurement components 824 can be provided at regular intervals, such as every 1" or 2". In one or more embodiments, each of the characteristic measurement components 824 can be a circuit configured to transmit radio frequency (RF) signals responsive to receipt of a signal from an interrogator, such as measurement device 130. A certain length of the strip 820 may be installed on a barrier, whereby the length of the original strip 820 may be reduced before being fit to the barrier. Signals output by the characteristic measurement components 824 in response to signals from the interrogator can provide information to the interrogator to determine a size (e.g., length) of the strip 820 installed on the barrier. Thus, for a known barrier, the determined size of the installed strip 820 can indicate whether a correct size of the strip 820 was used. Additionally or alternatively, resistive wires incorporated into the strip 820 may output data corresponding to resistive loss to determine a size (e.g., length) of the strip.

Figure 10:
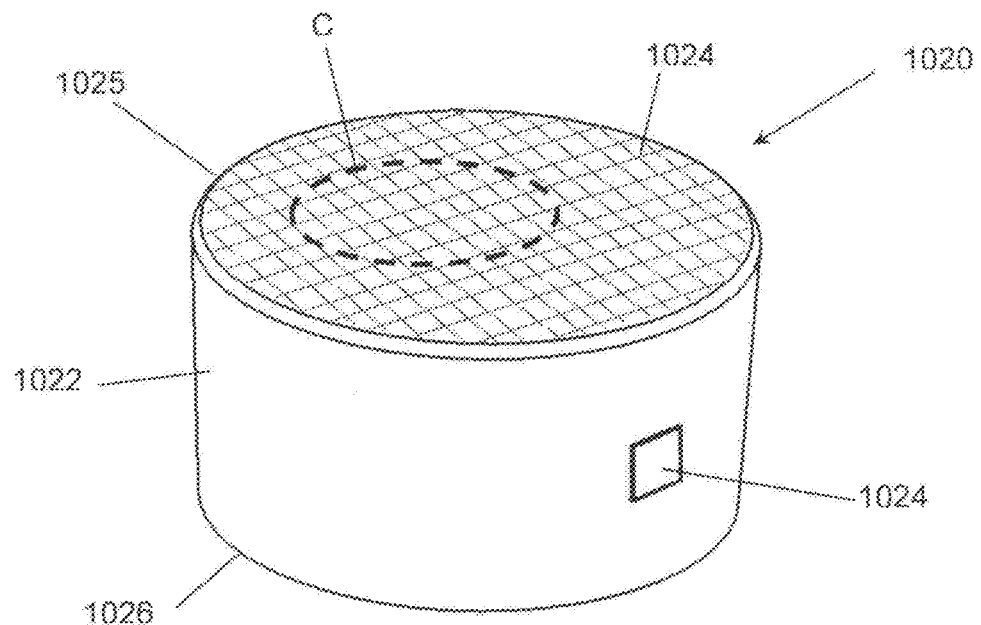
FIG. 10 is a perspective view of a barrier device in the form of a plug, according to one or more embodiments of the disclosed subject matter.
Figure 11:
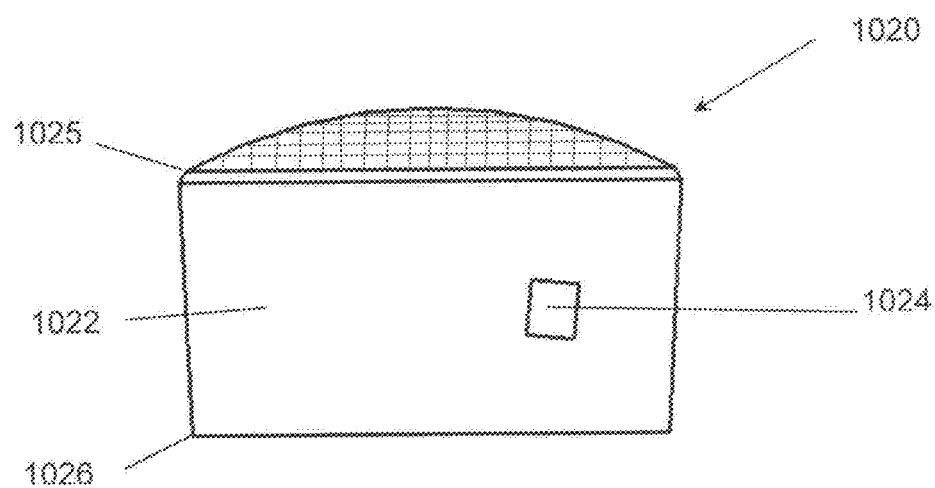
FIG. 11 is a side view of the barrier device of FIG. 11.

Turning now to FIGS. 10 and 11, these figures illustrate various views of a barrier device in the form of a plug 1020. Optionally, the plug 1020 may be made of a compressive foam. The plug 1020 can have a body 1022 that defines a first end 1025 and a second end 1026 distal to the first end 1025. In one or more embodiments, one or more characteristic measurement components 1024 can be provided in or on the body 1022 of the plug 1020. In this regard, the characteristic measurement component 1024 can be a stress or pressure sensor to measure compressive forces acting on the plug 1020 by a surrounding barrier or another barrier device. Additionally or alternatively, the characteristic measurement component 1024 may be in the form of a mesh-based resistive system (e.g., fiberglass mesh) at the first end 1025, whereby a change in the area of the first end 1025, such as cutting out portion 'C' in FIG. 10, can change a resistive characteristic of the mesh-based resistive system. Values of resistance for the mesh-based resistive system can correspond to an amount of the first end 1025 of the plug 1020 removed during installation (e.g., to provide a relatively smaller opening for cables to run through). Data output to the measurement device 130, for instance, can be analyzed to determine whether too much of the first end 1025 of the plug 1020 was removed during installation to identify whether the plug 1020 was installed correctly.

Figure 12:
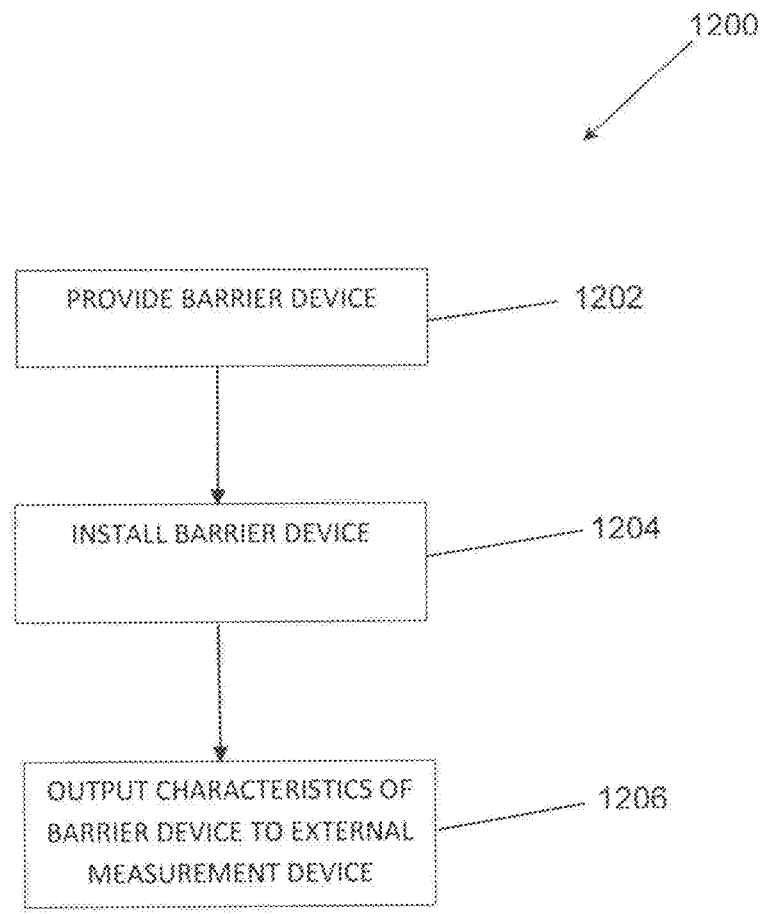
FIG. 12 is a flow chart of a method according to one or more embodiments of the disclosed subject matter.

FIG. 12 is a flow chart of a method 1200 according to one or more embodiments of the disclosed subject matter.

At block 1202, the method 1200 can include providing a barrier device, such as described herein.

At block 1204, the method 1200 can include installing the barrier device relative to a barrier. As noted above, barriers can include a firestop barrier, a smoke barrier, an air flow barrier, a thermal barrier, a water barrier, or a multi-functional barrier of two or more types of the foregoing barriers. More specific barrier examples include walls, floors, and ceilings. Installation of the barrier device relative to the barrier can include physically coupling the barrier device to and/or in the barrier. Optionally, installation of the barrier device may entail installing one barrier device, such as the barrier device 1020 of FIGS. 10 and 11 in another barrier device, such as the barrier device 320 of FIGS. 3-5. For example, the barrier device 1020 of FIGS. 10 and 11 may be installed in or on one of the first end 325 or the second end 326 of the barrier device 320 of FIGS. 3-5.

At block 1206, the barrier device provided relative to the barrier can output data corresponding to characteristics of the barrier device when provided relative to the barrier. For example, the barrier device may output such data to a device remote from the barrier device, such as the measurement device 130 of FIG. 1. More specifically, the barrier device can output data corresponding to characteristics of the barrier device pertaining to installation of the barrier device relative to the barrier and/or characteristics of the barrier device pertaining to use or operating conditions of the barrier device when installed, such as described above. Optionally, the data corresponding to characteristics of the barrier device can be output by the barrier device in response to a request from the measurement device 130.

Embodiments of the disclosed subject matter may also be as set forth according to the following parentheticals.

(1) A barrier device configured to be provided relative to a barrier and to output, to a measurement device or system, data corresponding to characteristics of the barrier device to identify whether the barrier device is installed correctly or is no longer installed correctly and/or data corresponding to characteristics of the barrier device associated with use of the barrier device when installed, the barrier device comprising: a body configured to be provided on or at least partially in the barrier; and at least one characteristic measurement component provided in, on, or adjacent to the body configured to output to the measurement device or system the data corresponding to characteristics of the barrier device to identify whether the barrier device is installed correctly or is no longer installed correctly and/or the data corresponding to characteristics of the barrier device associated with use of the barrier device when installed.

(2) The barrier device according to (1), wherein the at least one characteristic measurement component is configured to output from the barrier device to the measurement device or system only the data corresponding to corresponding to characteristics of the barrier device to identify whether the barrier device is installed correctly or is no longer installed correctly.

(3) The barrier device according to (1), wherein the at least one characteristic measurement component is configured to output from the barrier device to the measurement device or system only the data corresponding to characteristics of the barrier device associated with use of the barrier device when installed.

(4) The barrier device according to any one of (1) to (3), wherein the data corresponding to characteristics of the barrier device associated with use of the barrier device when installed include data corresponding to one or more of a temperature associated with the barrier device, presence of water in the barrier device, air flow associated with the barrier device, stress and strains placed on the barrier device, a compressive force applied to the barrier device, a length of the body, occupied inner volume, including an amount of change of the occupied inner volume, of the barrier device, and a unique identifier that identifies the barrier device.

(5) The barrier device according to any one of (1) to (4), wherein the at least one characteristic measurement component is one or more of a temperature sensor, a water sensor, an air flow sensor, a stress or strain sensor, a pressure sensor, a movement sensor, a capacitive sensor, and a resistance sensor, and wherein the measurement device or system is either arranged external to the barrier device or onboard the barrier device.

(6) The barrier device according to any one of (1) to (5), wherein the barrier device is a fire-protection sleeve configured be installed relative to the barrier such that at least one portion is exposed from the barrier and at least one portion is unexposed from the barrier, and wherein the body is a housing that defines an inner volume between a first end of the housing and a second end of the housing separated from the first end in a longitudinal direction of the housing.

(7) The barrier device according to any one of (1) to (6), wherein the barrier device is further comprised of at least one flange configured to be movable from the first end of the housing toward the second end of the housing to provide a compressive force to a first side of the barrier and a restraining force to the housing when the barrier device is installed, and wherein the at least one characteristic measurement component is provided in, on, as, or adjacent to the first flange and configured to output from the barrier device to the measurement device or system the data corresponding to characteristics of the barrier device to identify whether the barrier device is installed correctly or is no longer installed correctly, including whether the at least one flange is installed correctly or is no longer installed correctly.

(8) The barrier device according to any one of (1) to (7), wherein the at least one characteristic measurement component includes at least one sensor partially inside the at least one flange, fully inside the at least one flange or on the at least one flange, configured to sense stress, pressure and/or torsion applied by the at least one flange as the compressive force to indicate whether the at least one flange is installed correctly or is no longer installed correctly.

(9) The barrier device according to any one of (1) to (8), wherein the barrier device is further comprised of a flange gasket configured to be provided between the at least one flange and the barrier when the barrier device is installed, and wherein the at least one characteristic measurement component is provided relative to the flange gasket to detect characteristics of the flange gasket for output from the barrier device to the measurement device or system as the data corresponding to characteristics of the barrier device to identify whether the barrier device is installed correctly or is no longer installed correctly, including whether the at least one flange is installed correctly or is no longer installed correctly.

(10) The barrier device according to any one of (1) to (9), wherein the at least one characteristic measurement component includes a sensor provided in or on the housing configured to sense stress, pressure and/or torsion applied to the housing from inside the inner volume.

(11) The barrier device according to any one of (1) to (10), wherein the at least one characteristic measurement component includes a detector provided in or on the housing configured to detect type and/or number of cables provided in the inner volume of the housing.

(12) The barrier device according to any one of (1) to (11), wherein the barrier device is a cast-in sleeve, wherein the body is a housing that defines an inner volume between a first end of the housing and a second end of the housing separated from the first end in a longitudinal direction of the housing, and wherein the at least one characteristic measurement component includes a sensor to sense stress or pressure applied to a base member of the cast-in sleeve by a jacket tube of the cast-in sleeve, a sensor to measure moisture inside the inner volume of the housing and/or a sensor to measure a type of material of the jacket tube.

(13) The barrier device according to any one of (1) to (12), wherein the barrier device is a plug formed of a compressive foam, the plug including an end wall and at least one sidewall, and wherein the at least one characteristic measurement component includes a sensor provided in or on the at least one sidewall to sense stress or pressure applied to the plug and/or a mesh-based sensor to detect an area of the end wall removed as part of installation of the barrier device.

(14) The barrier device according to any one of (1) to (13), wherein the barrier device is a strip configured to be coupled to an intumescent, fire-resistive material, and/or foam overlay, wherein the at least one characteristic measurement component includes a plurality of individual circuits arranged at regular intervals along a length of the strip, and wherein the data corresponding to characteristics of the barrier device to identify whether the barrier device is installed correctly or is no longer installed correctly represent a present length of the strip.

(15) A system for receiving data corresponding to characteristics of a barrier device associated with use of the barrier device and/or installation of the barrier device, the system comprising: the barrier device, the barrier device being configured to be provided relative to a barrier and to output the data corresponding to characteristics of the barrier device, the barrier device including: at least one characteristic measurement component provided in or on the barrier device configured transmit the data corresponding to characteristics of the barrier device; and a processor, remote from the barrier device, configured to receive the data corresponding to characteristics of the barrier device from the barrier device via a wired or wireless communication medium.

(16) The system according to (15), wherein the processor is configured to analyze the received data corresponding to characteristics of the barrier device and determine whether the barrier device is installed correctly or is no longer installed correctly.

(17) The system according to (15) or (16), wherein the data corresponding to characteristics of the barrier device corresponds to an installation-tightness of the barrier device relative to the barrier and a unique identifier that identifies the barrier device.

(18) The system according to any one of (15) to (17), wherein the at least one characteristic measurement component is configured to transmit the data corresponding to characteristics of the barrier device responsive to a signal received from the processor.

(19) A protection sleeve configured be installed relative to a barrier, comprising: a housing that defines an inner volume between a first end of the housing and a second end of the housing separated from the first end in a longitudinal direction of the housing; a first flange configured to be movable from the first end of the housing toward the second end of the housing; a second flange configured to be provided between the barrier and the second end of the housing; and circuitry configured to sense characteristics of the protection sleeve associated with installation of the protection sleeve or a component relative to the protection sleeve and output data corresponding to the sensed characteristics of the protection sleeve to a monitoring device arranged external to the protection sleeve.

(20) The protection sleeve according to (19), further comprising an elastomeric gasket configured to be provided between the first flange and the barrier when the protection sleeve is installed relative to the barrier, the circuitry being provided in or adjacent to the elastomeric gasket.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A barrier device configured to be provided relative to a barrier and to output, to a measurement device or system, data corresponding to characteristics of the barrier device to identify whether the barrier device is installed correctly or is no longer installed correctly and/or data corresponding to characteristics of the barrier device associated with use of the barrier device when installed, the barrier device comprising:
a body configured to be provided on or at least partially in the barrier; and
at least one characteristic measurement component provided in, on, or adjacent to the body configured to output to the measurement device or system the data corresponding to characteristics of the barrier device to identify whether the barrier device is installed correctly or is no longer installed correctly and/or the data corresponding to characteristics of the barrier device associated with use of the barrier device when installed,
wherein the barrier device is a fire-protection sleeve configured be installed relative to the barrier such that at least one portion is exposed from the barrier and at least one portion is unexposed from the barrier, and
wherein the body is a housing that defines an inner volume between a first end of the housing and a second end of the housing separated from the first end in a longitudinal direction of the housing.

2. The barrier device according to claim 1, wherein the at least one characteristic measurement component is configured to output from the barrier device to the measurement device only the data corresponding to corresponding to characteristics of the barrier device to identify whether the barrier device is installed correctly or is no longer installed correctly.

3. The barrier device according to claim 1, wherein the at least one characteristic measurement component is configured to output from the barrier device to the measurement device only the data corresponding to characteristics of the barrier device associated with use of the barrier device when installed.

4. The barrier device according to claim 1, wherein the data corresponding to characteristics of the barrier device associated with use of the barrier device when installed include data corresponding to one or more of a temperature associated with the barrier device, presence of water in the barrier device, air flow associated with the barrier device, stress and strains placed on the barrier device, a compressive force applied to the barrier device, a length of the body, occupied inner volume, including an amount of change of the occupied inner volume, of the barrier device, and a unique identifier that identifies the barrier device.

5. The barrier device according to claim 1,
wherein the at least one characteristic measurement component is one or more of a temperature sensor, a water sensor, an air flow sensor, a stress or strain sensor, a pressure sensor, a movement sensor, a capacitive sensor, and a resistance sensor, and
wherein the measurement device or system is either arranged external to the barrier device or onboard the barrier device.

6. The barrier device according to claim 1,
wherein the barrier device is further comprised of at least one flange configured to be movable from the first end of the housing toward the second end of the housing to provide a compressive force to a first side of the barrier and a restraining force to the housing when the barrier device is installed, and
wherein the at least one characteristic measurement component is provided in, on, as, or adjacent to the first flange and configured to output from the barrier device to the measurement device or system the data corresponding to characteristics of the barrier device to identify whether the barrier device is installed correctly or is no longer installed correctly, including whether the at least one flange is installed correctly or is no longer installed correctly.

7. The barrier device according to claim 6, wherein the at least one characteristic measurement component includes at least one sensor partially inside the at least one flange, fully inside the at least one flange or on the at least one flange, configured to sense stress, pressure and/or torsion applied by the at least one flange as the compressive force to indicate whether the at least one flange is installed correctly or is no longer installed correctly.

8. The barrier device according to claim 1,
wherein the barrier device is further comprised of a flange gasket configured to be provided between the at least one flange and the barrier when the barrier device is installed, and
wherein the at least one characteristic measurement component is provided relative to the flange gasket to detect characteristics of the flange gasket for output from the barrier device to the measurement device or system as the data corresponding to characteristics of the barrier device to identify whether the barrier device is installed correctly or is no longer installed correctly, including whether the at least one flange is installed correctly or is no longer installed correctly.

9. The barrier device according to claim 1, wherein the at least one characteristic measurement component includes a sensor provided in or on the housing configured to sense stress, pressure and/or torsion applied to the housing from inside the inner volume.

10. The barrier device according to claim 1, wherein the at least one characteristic measurement component includes a detector provided in or on the housing configured to detect type and/or number of cables provided in the inner volume of the housing.

11. The barrier device according to claim 1,
wherein the barrier device is a cast-in sleeve as the fire-protection sleeve, and
wherein the at least one characteristic measurement component includes a sensor to sense stress or pressure applied to a base member of the cast-in sleeve by a jacket tube of the cast-in sleeve, a sensor to measure moisture inside the inner volume of the housing and/or a sensor to measure a type of material of the jacket tube.

12. The barrier device of claim 1, further comprising:
a first flange configured to be movable from the first end of the housing toward the second end of the housing;
a second flange configured to be provided between the barrier and the second end of the housing; and
circuitry configured to sense characteristics of the protection sleeve associated with installation of the protection sleeve or a component relative to the protection sleeve and output data corresponding to the sensed characteristics of the protection sleeve to a monitoring device arranged external to the protection sleeve.

13. The protection sleeve according to claim 12, further comprising an elastomeric gasket configured to be provided between the first flange and the barrier when the protection sleeve is installed relative to the barrier, the circuitry being provided in or adjacent to the elastomeric gasket.

14. A barrier device configured to be provided relative to a barrier and to output, to a measurement device or system, data corresponding to characteristics of the barrier device to identify whether the barrier device is installed correctly or is no longer installed correctly and/or data corresponding to characteristics of the barrier device associated with use of the barrier device when installed, the barrier device comprising:
a body configured to be provided on or at least partially in the barrier; and
at least one characteristic measurement component provided in, on, or adjacent to the body configured to output to the measurement device or system the data corresponding to characteristics of the barrier device to identify whether the barrier device is installed correctly or is no longer installed correctly and/or the data corresponding to characteristics of the barrier device associated with use of the barrier device when installed,
wherein the barrier device is a plug formed of a compressive foam, the plug including an end wall and at least one sidewall, and
wherein the at least one characteristic measurement component includes a sensor provided in or on the at least one sidewall to sense stress or pressure applied to the plug and/or a mesh-based sensor to detect an area of the end wall removed as part of installation of the barrier device.

15. A barrier device configured to be provided relative to a barrier and to output, to a measurement device or system, data corresponding to characteristics of the barrier device to identify whether the barrier device is installed correctly or is no longer installed correctly and/or data corresponding to characteristics of the barrier device associated with use of the barrier device when installed, the barrier device comprising:
a body configured to be provided on or at least partially in the barrier; and
at least one characteristic measurement component provided in, on, or adjacent to the body configured to output to the measurement device or system the data corresponding to characteristics of the barrier device to identify whether the barrier device is installed correctly or is no longer installed correctly and/or the data corresponding to characteristics of the barrier device associated with use of the barrier device when installed,
wherein the barrier device is a strip configured to be coupled to an intumescent, fire-resistive material, and/or foam overlay,
wherein the at least one characteristic measurement component includes a plurality of individual circuits arranged at regular intervals along a length of the strip, and
wherein the data corresponding to characteristics of the barrier device to identify whether the barrier device is installed correctly or is no longer installed correctly represents a present length of the strip.

16. A system for receiving data corresponding to characteristics of a barrier device associated with use of the barrier device and/or installation of the barrier device, the system comprising:
the barrier device of claim 1, and
a processor, remote from the barrier device, configured to receive the data corresponding to characteristics of the barrier device from the barrier device via a wired or wireless communication medium,
wherein the data corresponding to characteristics of the barrier device corresponds to an installation-tightness of the barrier device relative to the barrier and a unique identifier that identifies the barrier device.

17. The system according to claim 16, wherein the processor is configured to analyze the received data corresponding to characteristics of the barrier device and determine whether the barrier device is installed correctly or is no longer installed correctly.

18. The system according to claim 16, wherein the at least one characteristic measurement component is configured to transmit the data corresponding to characteristics of the barrier device responsive to a signal received from the processor.

* * * * *